(12) United States Patent
Brooks

(10) Patent No.: X9742
(45) Date of Patent: Jun. 20, 1836

(54) SILK, WINDING, GIMP OR CORD

(76) Inventor: Adam Brooks

Adam Brooks

The Schedule referred to in these Letters Patent and mak-
ing part of the same containing a description in the
words of the said Adam Brooks himself of his im-
provement in the Machine for Winding Gimp or Cord.
To all to whom these presents shall come. Be it known
that I Adam Brooks of Scituate in the County of
Plymouth and State of Massachusetts have invented
new & useful improvement to a French machine for winding
Gimp or Cord. which in its operation winds the silk or
whatever thread the cord is covered with after it is twisted.
which had formerly to be done before it was applied to the
machine. I claim the invention and application of spindles
and fliers marked A. in such a way as to make the ~~twist~~ necessary
twist by the movement of the machine before the cord is cov-
ered. The old machine was so fixed that the operator
had to carry the cord so as to lay it on the spools after it
was covered equal by turning a screw by hand and
which required constant attention. I have invented
and applied a heart motion B. which lays the cord or
gimp on equal the length of the spools. The old spin-
dles were made round where the spools were put on ex-
cept near the point which was square and made them
inconvenient on account of not holding the spools properly.
I have made a screw on the spindle that holds the
spool (by means of an iron nut in the end of the spool)
in a firm and durable manner. The old machine
had one small spool that contained the silk or thread
to wind around the cord. I have invented and applied
five or more spools on the wheel C. round the tube or
spindle, thereby enabling the operator to perform near
double the work in the same time and labour and also
by having two or more colours on the different spools to
make

United States Patent

Patent No.: X9742 make the gimp of different regular colours at the same time if required. I have also invented and applied weighted roller marked D (which may be weighted by a strap or cord or by a beam with weights suspended from the ends) for the cord to pass round after being twisted, in order to draw the cord sufficiently tight; I cover it well and also to [illegible] on an inclined plane which prevents the cord when passing round from interfering.

Scituate April 4th month 12th 1836. Adam Brooks

Witnesses

Samuel A Turner

Amos H. Tilden

Drawing

Exd [illegible]

[illegible] 410 W 83

United States Patent
Patent No.: X9742
A. Brooks.
Winding Bobbin.
Patented Jun. 20, 1836.
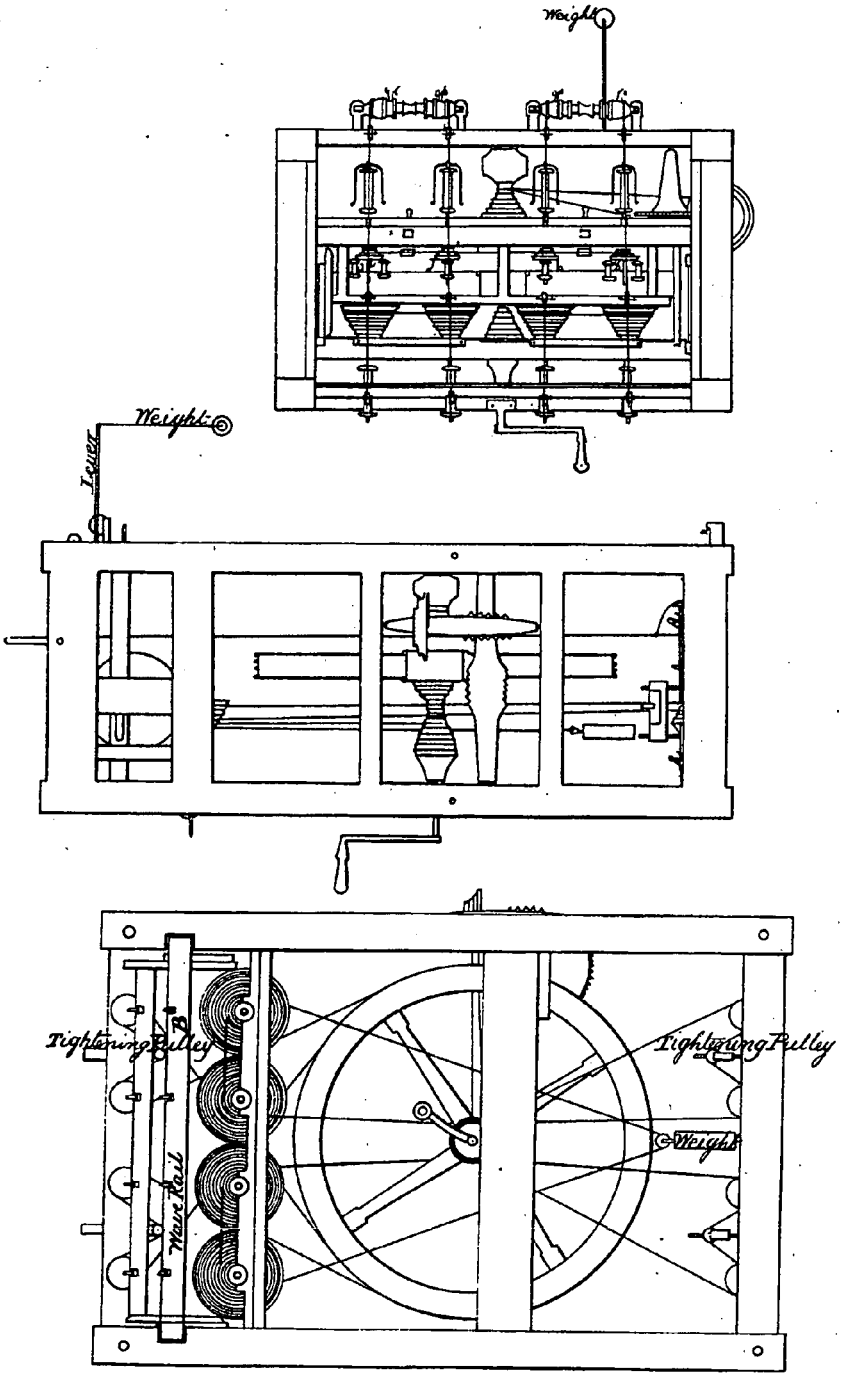
N. PETERS, PHOTO-LITHOGRAPHER, WASHINGTON, D. C.

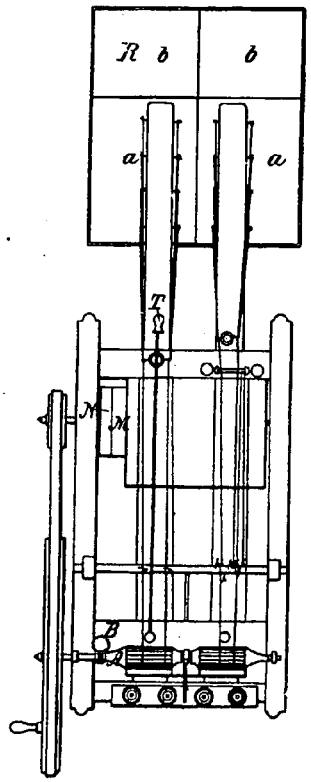
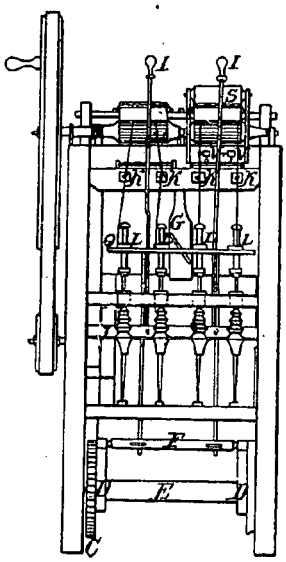
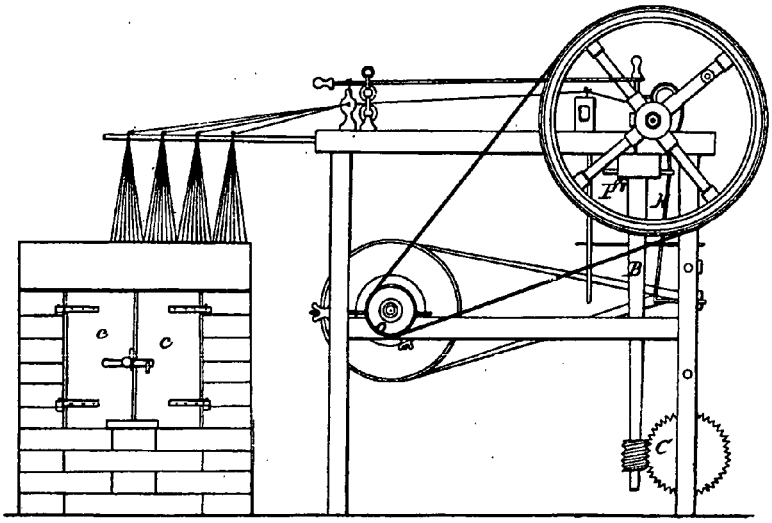

United States Patent
Patent No.: X9742
A. Brook.
Silk Spinning.
Patented Jun. 20, 1836.